Figure 1:
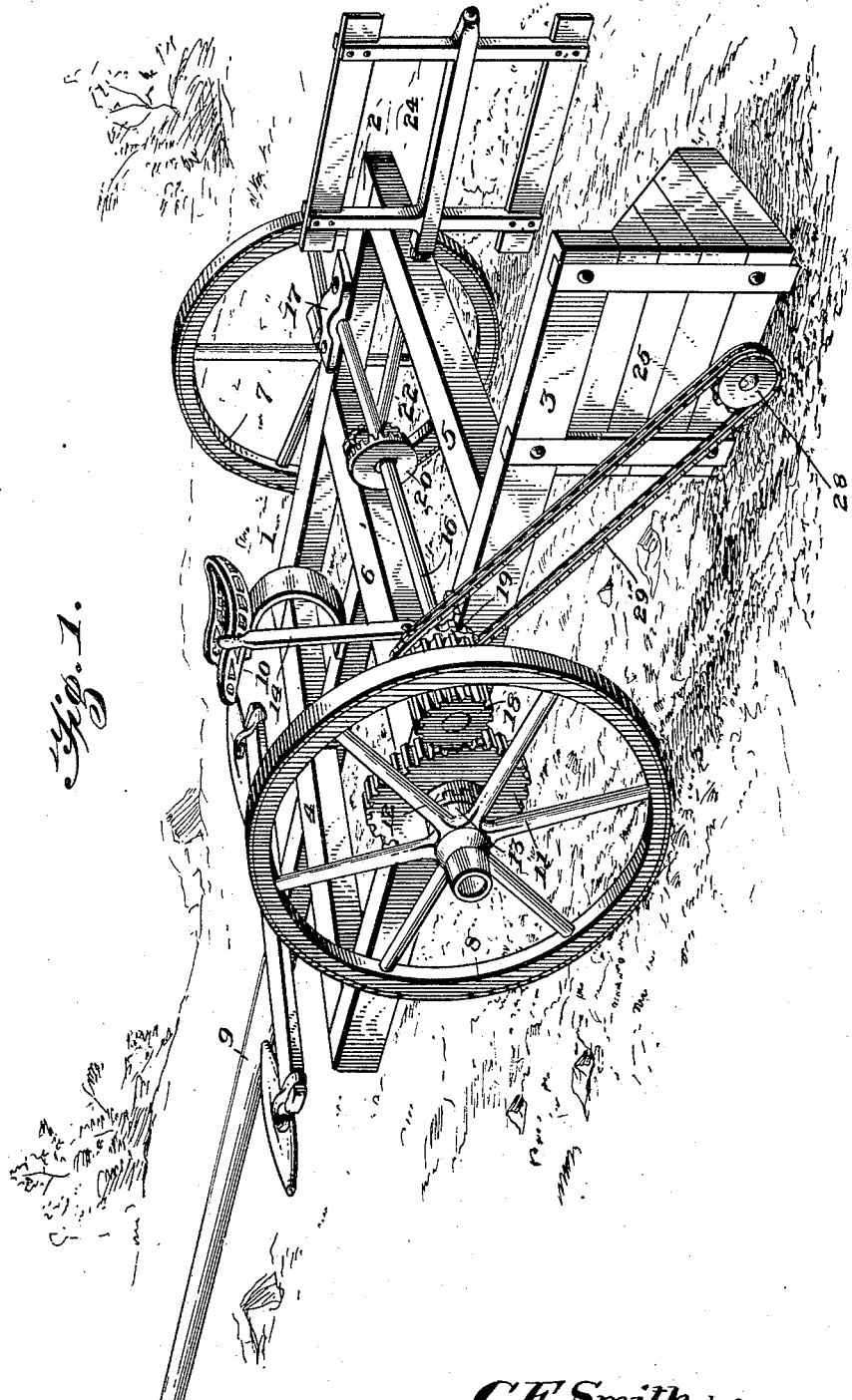

No. 674,026. Patented May 14, 1901.
C. F. SMITH.
POTATO BUG DESTROYER.
(Application filed Feb. 28, 1901.)

(No Model.) 2 Sheets—Sheet 1.

Witnesses

C. F. Smith, Inventor

Attorneys

No. 674,026. Patented May 14, 1901.
C. F. SMITH.
POTATO BUG DESTROYER.
(Application filed Feb. 28, 1901.)
(No Model.) 2 Sheets—Sheet 2.
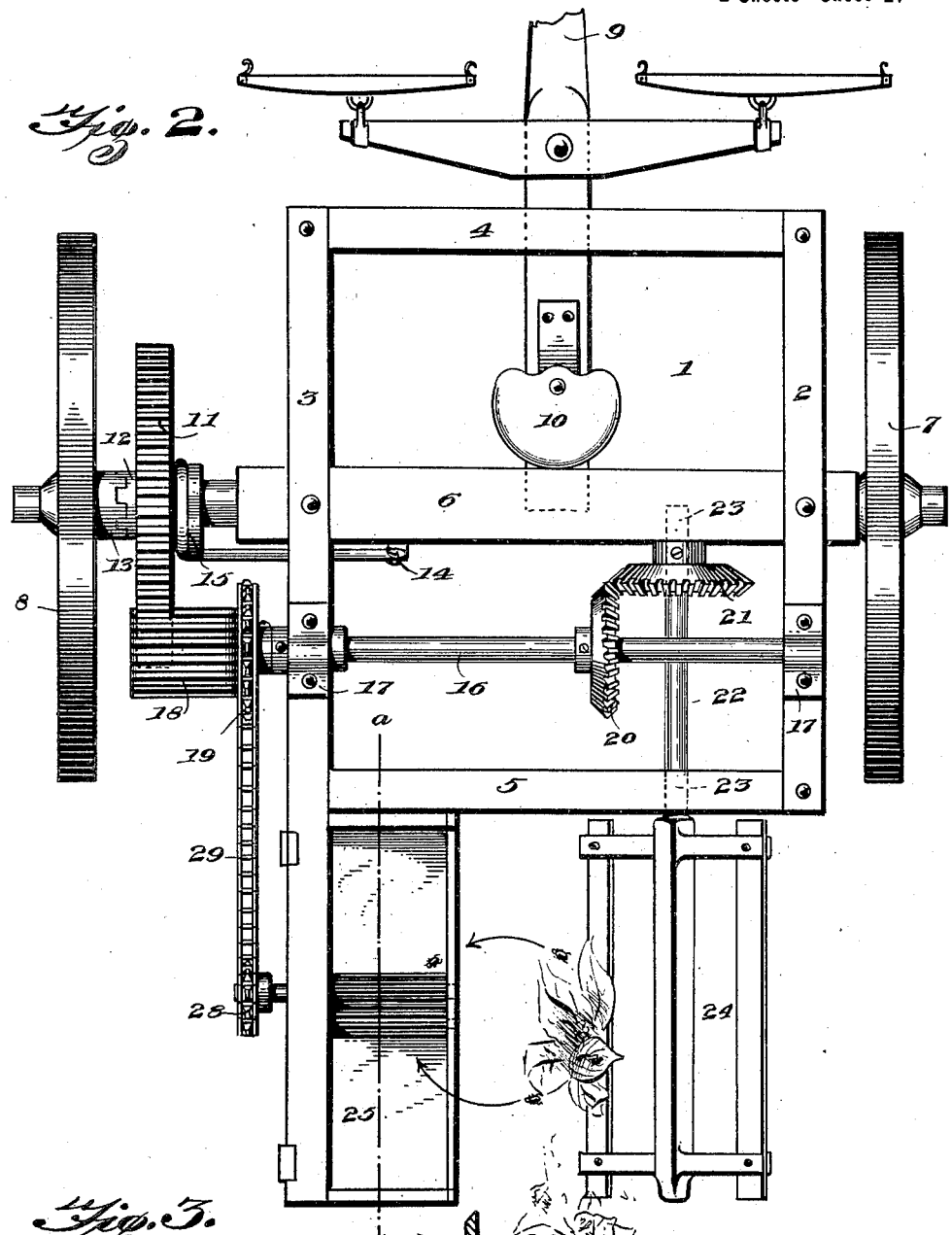
Fig. 2.
Fig. 3.
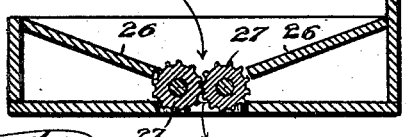
Witnesses
C. F. Smith, Inventor
by C. A. Snow & Co.
Attorneys
THE NORRIS PETERS CO., PHOTO-LITHO., WASHINGTON, D. C.

UNITED STATES PATENT OFFICE.

CHARLES F. SMITH, OF MELROSE, WISCONSIN.

POTATO-BUG DESTROYER.

SPECIFICATION forming part of Letters Patent No. 674,026, dated May 14, 1901.

Application filed February 28, 1901. Serial No. 49,322. (No model.)

*To all whom it may concern:*

Be it known that I, CHARLES F. SMITH, a citizen of the United States, residing at Melrose, in the county of Jackson and State of Wisconsin, have invented a new and useful Potato-Bug Destroyer, of which the following is a specification.

My invention is an improved machine for destroying potato-bugs; and it consists in the peculiar construction and combination of devices hereinafter fully set forth and claimed.

The object of my invention is to provide an improved machine which is adapted to be driven along the rows of growing potato-plants and which is efficient in knocking the bugs from the plants and destroying the bugs.

In the accompanying drawings, Figure 1 is a perspective view of a potato-bug-destroying machine constructed in accordance with my invention. Fig. 2 is a top plan view of the same. Fig. 3 is a detail sectional view taken on a plane indicated by the line *a a* in Fig. 2.

In the embodiment of my invention I provide a frame 1, which is preferably of the form here shown, but may be of any suitable form and comprises the side bars 2 3 and cross-bars 4 5. An axle 6 is attached to the frame, and wheels 7 8, which support the frame, are mounted on the axle. From the front end of the frame projects a tongue 9, to which the draft-animals are attached. A seat 10 is here shown as mounted on the rear portion of the tongue.

A spur-wheel 11 is loose on the axle and is adapted to be shifted laterally thereon, and said spur-wheel and said wheel 8 are provided, respectively, with clutch members 12 13. Thereby the said spur-wheel may be moved into and out of engagement with the said wheel 8. A hand-lever 14 is provided and mounted on the frame 1 at any suitable point and is connected to the clutch member of the gear 11, as at 15. Said lever serves to move said gear into and out of engagement with the wheel 8, as will be understood.

A shaft 16 is disposed transversely in the frame 1 and is journaled in suitable bearings 17. Said shaft has a pinion 18 at one end which is in engagement with the spur-wheel 11. The width of the said pinion is such that the said spur-wheel 11 is not disengaged therefrom when the same is disengaged from the wheel 8. The said shaft 16 is further provided with a sprocket-wheel 19 and with a miter gear-wheel 20. The latter engages a similar gear 21 on a longitudinally-disposed shaft 22, which shaft is journaled in bearings 23 and extends rearwardly from the frame, at one side thereof, and carries at its rear end a revoluble beater 24.

The side bar 3 of frame 1 is prolonged rearwardly beyond the rear cross-bar 5, and attached to the said prolonged portion of said bar 3 and depending therefrom is a box 25, which is disposed opposite the beater 24 and is open on the side opposite said beater. The said box is provided with oppositely-inclined longitudinally-disposed bottom boards 26, which form a hopper therein and converge downwardly, their inner ends being spaced apart. A pair of corrugated rollers 27 are disposed transversely in the box 25, have their bearings in the sides thereof, and are located in the space between the said inclined boards 26. One of these rollers is provided at the outer end of its shaft with a sprocket-wheel 28, which is connected to the sprocket-wheel 19 by a sprocket-chain 29.

When the machine is in operation and the gear 11 locked to the wheel 8, the beater and corrugated rollers are rotated, as will be understood, and the machine being driven parallel with the rows of potato-plants, so that the plants pass between the beater and the box 25, the beater is efficient by its action on the plants in knocking the potato-bugs therefrom into the box 25. The bugs are conducted by the inclined bottom 26 to the rollers by which they are crushed.

A suitable chain-tightening device of the usual form may be employed to keep the chain 29 at the requisite tension. The front end of the box 26 is open, as shown in Fig. 3.

Having thus described my invention, I claim—

The combination of a frame having supporting-wheels, a gear, a clutch to engage the same with one of the supporting-wheels and disengage the same therefrom, a lever to operate said clutch, a transversely-disposed shaft in the frame having a pinion engaged by the gear, a longitudinally-disposed shaft geared to said transversely-disposed shaft, a revoluble beater carried by said longitudinally-disposed shaft, a box carried by the frame and disposed opposite said beater, crushing-rolls in said box and connections between said crushing-rolls and said transversely-disposed shaft whereby said crushing-rolls are rotated, substantially as described.

In testimony that I claim the foregoing as my own I have hereto affixed my signature in the presence of two witnesses.

CHARLES F. SMITH.

Witnesses:
 JNO. ANDERSON,
 ROBERT CROWLEY.